Oct. 15, 1940.    F. H. EHNTS    2,217,736
LUBRICATING NOZZLE
Filed Jan. 12, 1938
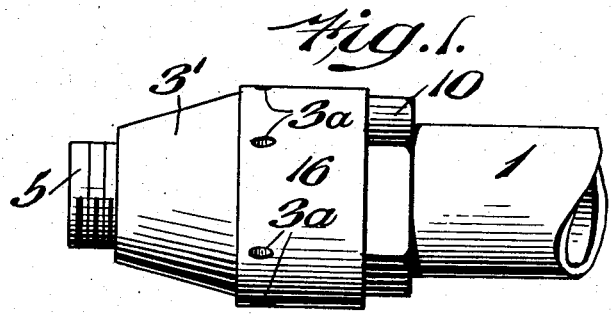
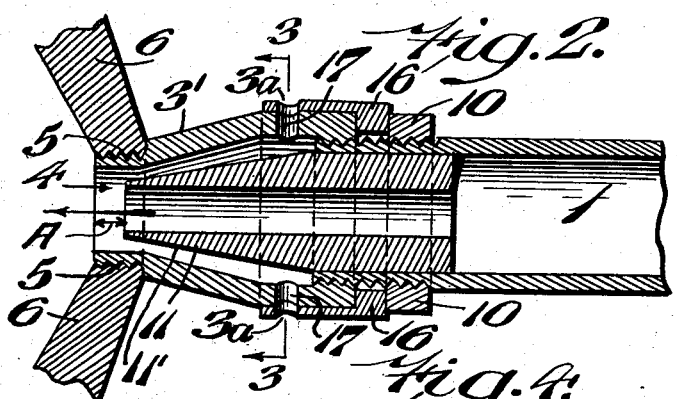
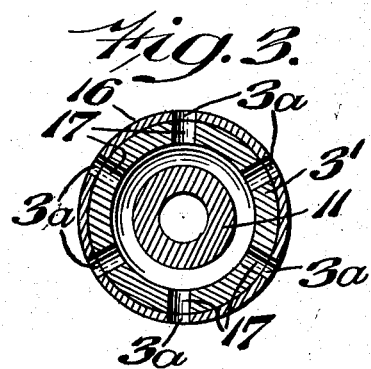
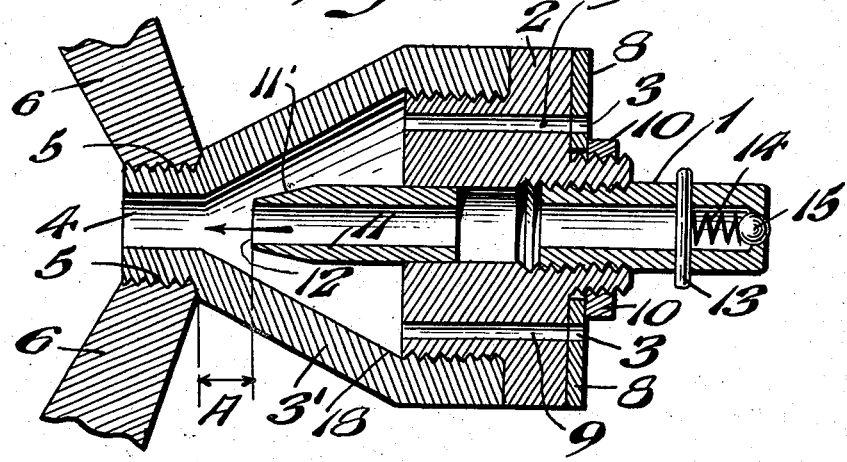
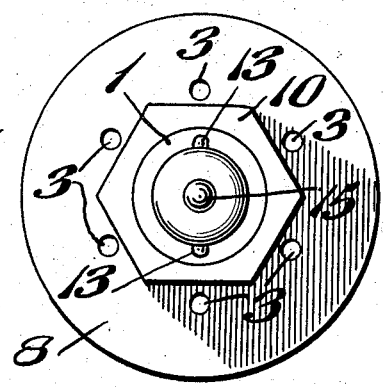
INVENTOR
Fred Henry Ehnts
BY Wm. G. Schmidt
ATTORNEY Patented Oct. 15, 1940

2,217,736

UNITED STATES PATENT OFFICE 2,217,736

LUBRICATING NOZZLE

Fred Henry Ehnts, Philadelphia, Pa., assignor to Keystone Lubricating Company, Philadelphia, Pa., a corporation of Pennsylvania Application January 12, 1938, Serial No. 184,511

12 Claims. (Cl. 184—105)

My invention relates generally to greasing or lubricating apparatus and more particularly to improvements in back-pressure indicating fittings or nozzles through which grease is discharged into bearings.

One of the objects is to provide a fitting or nozzle that is readily applied to the filling vent of a bearing housing for the purpose of filling the bearing with the required quantity of grease at a predetermined and a desirable operating pressure. In the specialized field of bearing lubrication, the practice has been heretofore to inject the grease into a bearing under pressure without a means of ascertaining whether the pressure is adequate or not. Not infrequently the zealous operator in a spirit of excess caution fills the bearing with grease under too great a pressure, thus expressing a faulty lubricating technique that may result in heating the grease excessively and cause the bearing to run "hot" and to become irreparably damaged. It is now recognized that space must be allowed for normal expansion of grease which occurs due to speed and operating temperatures, otherwise overheating of the bearing will occur. Overlubricant under high pressure may even prevent the balls or rolls in a bearing from revolving thus causing scuffing and permanent injury to the bearing. My invention avoids the hazards of direct pressure greasing by indicating in a visible manner when the bearing is filled with the required quantity of grease under a proper pressure.

Another object of my invention is to provide a fitting or nozzle that will indicate to the operator any irregular or unanticipated obstruction existent in the bearing that may be caused by solidified grease or other factors. Should the bearing really require greasing and, nevertheless, the nozzle expels grease from its rear surface when the gun discharges grease into the bearing, the operator is immediatly apprised of a defective condition in the bearing that may be imputable to a number of causes.

A further object of my invention is to provide a nozzle that can be readily adjusted to serve as a direct high pressure discharging nozzle to be attached to a pressure gun of either the continuous or intermittent feeding type.

An additional object of my invention is to provide a fitting or nozzle of the type referred to which can be readily and detachably applied to a vent in a bearing housing and be maintained in more or less permanent association with a bearing in order that a grease gun can, when the occasion requires, be quickly engaged with a bearing and its associated fitting or nozzle either directly or through the medium of a conduit for the purpose of supplying grease.

For the purpose of illustrating my invention I have shown in the accompanying drawing forms thereof which have been found in practice to give satisfactory and reliable results, although it is to be understood that the various instrumentalities of which my invention consists can be variously arranged and organized and that my invention is not limited to the precise arrangement and organization of the instrumentalities as herein shown and described.

My invention relates to several other novel features of construction and advantage appearing as hereinafter described and claimed in connection with the accompanying drawing in which:

Fig. 1 represents a side elevation of a slender nozzle adapted to become a fitting of a bearing.

Fig. 2 represents an axial sectional view of the nozzle shown in Fig. 1.

Fig. 3 represents a transverse sectional view of the nozzle taken on line 3—3 of Fig. 2.

Fig. 4 represents an axial sectional view of a modified form of my invention.

Fig. 5 is an end elevation of the fitting shown in Fig. 4 when viewed from the left end thereof.

Referring to the drawing in which like reference numerals indicate like parts and with initial reference to Fig. 4, I is a length of metal tubing that may be attached at one end to a metering or measuring grease gun (not shown). At the other end the tube I engages threadedly with the cap 2 which in a manner similar to a ferrule engages threadedly with the orifice element 3'. The cap 2 is perforated with a plurality of holes 9, constant in diameter and distributed uniformly on a circumference concentric with the external periphery of the cap 2. The orifice element 3' approximates in shape and contour a truncated hollow cone with its smaller open end 4 formed with an axial externally-threaded nipple adapted to engage with a threaded vent 5 of the bearing housing 6. The base or the larger opening of the orifice element 3' is threaded to engage the cap 2. Over the tube I and bearing on the cap 2 is the perforated washer 8, the holes 3 of which are distributed on a circumference that coincides with a similar circumference on the cap 2 but the diameters of which vary slightly between close limits. The washer 8 can be rotated freely about the tube I and, accordingly, can be set in an indefinite number of positions relatively to the perforated cap 2, ranging from a position in which all of the perforations of the cap 2 are closed to a position in which all of the aforesaid perforations are open. The lock nut 10 threaded to engage a reduced threaded axial extension on the cap 2 serves to hold securely the washer 8 in any predetermined relationship with the cap 2.

A thin walled cylindrical tube 11 having an exteriorly tapered end 11' is fitted snugly into the smooth bore of the threaded tube 1 and is adjustable in that its end 12 can be advanced toward or withdrawn from the smaller end of the orifice element 3' to thereby vary the restricted opening between the end 12 of the tube 11 and the enclosing wall of the orifice element 3'. If the distance A is decreased then the area of the restricted opening above referred to is decreased and the pressure at which the grease will be expelled from the bearing 6 is increased; and if the distance A is increased then the area of the restricted opening is increased and the pressure at which grease will be expelled from the filled bearing 6 will be decreased. The tube 1 may be provided as a supplemental check valve fitting consisting of the pin 13, the spring 14, and the ball 15 when the fitting is intended for use with certain standard types of grease guns.

The structure of the modified type of fitting shown in Figs. 1 to 3 is virtually the same as that illustrated in Fig. 4, and embodies the same scientific principles and is adapted to engage threadedly with a threaded vent 5 of the bearing housing 6, or to be attached to the vent 5 by any type of snug, detachable or frictional fit. However, in order that the small bearings on small apparatus may become more accessible to the grease gun, the sleeve 16 is freely rotatable about the tubing 1 and is perforated with a plurality of holes 3a, slightly variable in diameter and distributed uniformly on its lateral or cylindrical surface. The holes 3a are registrable with the openings 17 of constant diameter and distributed in coincidental relationship with holes 3a of the sleeve 16 on the lateral surface of the orifice element 3'. The sleeve 16 can be rotated freely about the tube 1 and, accordingly, can be set in an indefinite number of positions relatively to the perforated orifice element 3', ranging from a position in which all of the aforesaid perforations of the orifice element 3' are closed to a position in which all of the aforesaid perforations are open. The lock nut 10, threaded to engage the tubing 1, serves to hold securely the sleeve 16 in any predetermined relationship with the orifice element 3'.

The manner in which my device can be utilized becomes obvious when its operation is more fully described. The grease gun is of the metering or measuring type and with every release of its trigger a definite quantity of grease, approximately .07 oz., is discharged, as indicated by the solid arrow, through the orifice element opening 4 into the filling vent 5 of the bearing 6. For greasing a bearing to which a fitting of my invention has been attached and for avoiding excessive pressure of grease in said bearing, the washer 8 is rotated to bring the holes therein into coincident relation to the perforations in the cap and the restricted opening adjacent the discharge end of the fitting is adjusted to provide the required resistance to the back flow of grease in the bearing. When a sufficient quantity of grease has been admitted to the bearing 6 and the pressure therein builds up to exceed that governed by the restricted opening then the excess grease is expelled through the coincident perforations in the orifice element and the cap indicating immediately to the operator that the bearing 6 has been correctly and adequately greased. Experience has determined that a pressure of 1.5 to 3 oz. upon the grease in a bearing is ample for most purposes.

Should the operator desire, he can quickly release the lock nut 10, rotate the washer 8 in such a manner that the perforations in the cap are closed, and proceed to use the fitting with any type of gun in which case, the fitting will function as an ordinary high pressure fitting.

While the constructions as shown and described are the preferred embodiments of my device, nevertheless the same may be modified in detail without departing from the spirit and the scope of the invention as defined in the annexed claims.

Having thus described my invention, what I claim as new and desire to secure by Letters Patent is:

1. A lubricating fitting comprising a member having an intake opening adapted for engagement with a lubricant supply means, a discharge opening adapted for engagement with a member for receiving lubricant under pressure, means adjacent the discharge opening for attaching the first member to the member for receiving lubricant, and an unobstructed opening in the first member for permitting lubricant to escape therethrough when the lubricant in the receiving member has reached a predetermined pressure, the various parts of the fitting being fixed relatively to one another in use.

2. A lubricating fitting comprising a member having an intake opening adapted for engagement with a lubricant supply means, a discharge opening adapted for engagement with a member for receiving lubricant under pressure, means adjacent the discharge opening for attaching the first member to the member for receiving lubricant, and an unobstructed opening in the first member extending from a point adjacent the discharge opening rearwardly to the exterior of the member, the various parts of the fitting being fixed relatively to one another in use.

3. A lubricating fitting comprising a member having a passage therethrough and a housing enclosing said member having means for attachment with a member for receiving lubricant under pressure through said passage, said housing having an unobstructed opening therein normally establishing communication between the discharge end of said passage and the exterior of the housing when the fitting is connected to the lubricant receiving member, the various parts of the fitting being fixed relatively to one another in use.

4. A lubricant fitting comprising a member having a passage therethrough and a housing enclosing said member having means for attachment with a member for receiving lubricant under pressure through said passage, said housing having a chamber surrounding the discharge end of said passage and being in open communication therewith and an opening rearwardly of the discharge end thereof leading from the chamber to the exterior of the housing, the various parts of the fitting being fixed relatively to one another in use.

5. A fitting of the type described, comprising a casing having receiving means for engagement with a source of viscous material, means for attachment to a member for receiving the viscous material upon discharge from the casing under pressure, the casing having an opening therein providing open communication between the interior of the casing and the exterior thereof for permitting the escape of viscous material from the casing when the pressure of the viscous material in the receiving member exceeds a predetermined pressure, the various parts of the fitting being fixed relatively to one another in use.

6. A fitting of the type described, comprising a casing having receiving means for engagement with a source of viscous material, a tubular element within said casing in open communication with said receiving means, the discharge end of said tubular element being in spaced relation to the discharge end of the casing, means at the discharge end of the casing for attachment to a member for receiving the viscous material upon discharge from the casing under pressure, and said casing having an opening therein providing open communication between the interior of the casing and the exterior thereof adapted to permit the escape of viscous material therethrough from the casing when the pressure of said viscous material in the receiving chamber exceeds a predetermined pressure.

7. A fitting of the type described, comprising a casing having receiving means for engagement with a source of viscous material, a tubular element within said casing in open communication with said receiving means, the discharge end of said tubular element terminating rearwardly of, and in spaced relation to, the discharge end of the casing, means at the discharge end of the casing for attachment to a member for receiving the viscous material upon discharge from the casing under pressure, and said casing having an opening therein providing open communication between the interior of the casing and the exterior thereof for permitting the escape of viscous material therethrough from the casing when the pressure of said viscous material in the receiving chamber exceeds a predetermined pressure.

8. A fitting of the type described, comprising a casing having receiving means for engagement with a source of viscous material, a tubular element within said casing in open communication with said receiving means, the discharge end of said tubular element being in spaced relation to the discharge end of the casing and being adjustable with relation thereto to vary the radial distance between the opposed walls thereof, means at the discharge end of the casing for attachment to a member for receiving the viscous material upon discharge from the casing under pressure, and said casing having an opening therein providing open communication between the interior of the casing and the exterior thereof.

9. A fitting of the type described, comprising a casing having receiving means for engagement with a source of viscous material, a tubular element within said casing in open communication with said receiving means, the discharge end of said tubular element being in spaced relation to the discharge end of the casing, one of the opposed walls on the tubular element and on the casing at the discharge end of the fitting being of substantially conical form, and the tubular element being axially adjustable with relation to the casing to vary the radial distance between said opposed walls adjacent the discharge end of the casing, means at the discharge end of the casing for attachment to a member for receiving the viscous material upon discharge from the casing under pressure, and said casing having an opening therein rearwardly of the discharge end thereof providing open communication between the interior of the casing and the exterior thereof.

10. A tell-tale fitting for indicating when viscous lubricant supplied to a bearing has reached a predetermined pressure therein, comprising a hollow casing having a discharge end provided with means for attachment to the housing of the bearing to be lubricated, a tubular element within said casing, one end of said tubular element being adapted for connection with a source of lubricant and the other end being in spaced relation to the discharge end of the casing and providing therewith a restricted opening between the opposed walls of said members adjacent said discharge end, and the casing having an opening in its wall rearwardly of said discharge end providing open communication between the restricted opening at the opposed walls and the exterior of the casing.

11. The combination of a bearing or the like to be supplied with viscous lubricant and a fitting attached thereto and through which such lubricant may be supplied to said bearing, said fitting and bearing having passages through which the lubricant may be forced under pressure and one of said parts having an unobstructed opening for permitting lubricant to escape therethrough when the lubricant in the bearing has reached a predetermined pressure, the fitting in use having no relatively movable parts.

12. A tell-tale fitting for indicating when viscous lubricant supplied to a bearing has reached a predetermined pressure therein, comprising a hollow casing having a discharge end provided with means for attachment to the housing of the bearing to be lubricated, a tubular element within said casing, one end of said tubular element being adapted for connection with a source of lubricant and the other end being in spaced relation to the discharge end of the casing and providing therewith a restricted opening between the opposed walls of said members adjacent said discharge end, the casing having an opening in its wall rearwardly of said discharge end providing open communication between the restricted opening at the opposed walls and the exterior of the casing, and a member in engagement with said casing, said member having an opening therein for adjustable registry with the opening in the wall of the casing to vary the effective area of said last-mentioned opening.

FRED HENRY EHNTS.